(12) United States Patent
Lu

(10) Patent No.: US 8,430,062 B2
(45) Date of Patent: Apr. 30, 2013

(54) EXERCISE AND PLAY TOWER FOR ANIMALS

(75) Inventor: Kongzhi Lu, Xiamen (CN)

(73) Assignee: Xiamen Sunnypet Products Co., Ltd., Xiamen (CN)

( * ) Notice: Subject to any disclaimer, the term of this patent is extended or adjusted under 35 U.S.C. 154(b) by 85 days.

(21) Appl. No.: 13/053,620

(22) Filed: Mar. 22, 2011

(65) Prior Publication Data

US 2012/0186534 A1  Jul. 26, 2012

(30) Foreign Application Priority Data

Jan. 21, 2011  (CN) ...................... 2011 2 0020369 U

(51) Int. Cl.
*A01K 15/02* (2006.01)
*A01K 29/00* (2006.01)

(52) U.S. Cl.
USPC ........... 119/706; 119/702; 119/452; 119/455; 119/472; 119/474; 119/482; 119/498

(58) Field of Classification Search ................. 119/702, 119/706, 452, 455, 472, 474, 482, 498; D30/108; 248/405, 165; 108/144.11, 147.11, 147.12, 108/147.15, 147.19, 147.2, 147.21, 158.11, 108/106; 211/181.1, 182, 187, 188, 189, 211/194
See application file for complete search history.

(56) References Cited

U.S. PATENT DOCUMENTS

| | | | | |
|---|---|---|---|---|
| 4,111,217 A * | 9/1978 | Victor | ............................ | 135/114 |
| 4,347,807 A * | 9/1982 | Reich | ............................. | 119/499 |
| 4,497,279 A * | 2/1985 | Bell | ............................... | 119/706 |
| 4,858,561 A * | 8/1989 | Springer | ........................ | 119/165 |
| 5,481,988 A * | 1/1996 | Dess | .............................. | 108/106 |
| 5,622,415 A * | 4/1997 | Felsenthal et al. | .......... | 312/265.4 |
| 5,803,019 A * | 9/1998 | Heilborn et al. | ............... | 119/475 |
| 6,378,463 B1 * | 4/2002 | Simmons | ....................... | 119/707 |
| 6,527,473 B2 * | 3/2003 | Chen | ........................... | 403/374.1 |
| 7,337,748 B1 * | 3/2008 | Morris | ........................... | 119/482 |
| 7,628,119 B2 * | 12/2009 | Beaty Bishop | ................ | 119/474 |
| 7,789,044 B2 * | 9/2010 | McGrade | ........................ | 119/496 |
| 7,975,654 B2 * | 7/2011 | Beaty Bishop | ................ | 119/474 |
| 8,020,518 B1 * | 9/2011 | Reinke | ............................ | 119/482 |
| 8,074,583 B2 * | 12/2011 | Lee | ............................ | 108/147.13 |
| 2006/0138066 A1 * | 6/2006 | Hung et al. | ..................... | 211/189 |
| 2008/0105172 A1 * | 5/2008 | Repasky | ..................... | 108/144.11 |
| 2008/0149042 A1 * | 6/2008 | Halpern | ......................... | 119/706 |
| 2009/0001033 A1 * | 1/2009 | Sung | ............................ | 211/85.3 |
| 2009/0241812 A1 * | 10/2009 | Liu | ............................ | 108/147.19 |
| 2010/0154719 A1 * | 6/2010 | Kellogg et al. | ............... | 119/706 |

* cited by examiner

*Primary Examiner* — David J Parsley
*Assistant Examiner* — Timothy Schwarz
(74) *Attorney, Agent, or Firm* — Jen-Feng Lee, Esq.

(57) ABSTRACT

Present invention disclosed and claimed an easy to assemble exercise and play tower for animals, where a plurality of support plates are place in between a top and bottom plate, set up by a 3-post structure; an outer shield will be used to wrap up the skeletal structure and zipped snug in place by a vertical zipper and a horizontal zipper on top. At least some portion of the outer shield contains mesh type structure, to provide good ventilation.

6 Claims, 6 Drawing Sheets

EXERCISE AND PLAY TOWER FOR ANIMALS

CLAIM FOR FOREIGN PRIORITY

The present invention claims the earlier filing date of a foreign filing in China, dated Jan. 21, 2011, having application number 201120020369.0.

FIELD AND BACKGROUND OF PRESENT INVENTION

Keeping pets and other small animals around people's living environment has become a way of life. People enjoy the company of their pet animals; such companionship is known to be conducive to people's health, both physical and psychological aspects.

However, due to the modern day living, such "way of life" tends to cause the pets or animals to lose their needed play and exercise that will keep them healthy. This fact is reflected in many modern studies that show the trend of "overweight" pets, especially in the case of dogs and cats.

Present invention provides a simple yet cost-effective device to keep animals around people's living environment and facilitate animals' playing and exercise, thus promoting the health status of the animals that utilize the device of present invention.

OBJECT AND SUMMARY OF THE PRESENT INVENTION

Present invention teaches a simple exercise tower that is easy to assemble and cost-effect to keep animals active and stay healthy.

The tower structure of present invention takes up relatively small foot print and thus is very affordable even to people who live in cities or urban dwelling.

The primary structure is a three-post vertical stand, with horizontal dividing support plates evenly placed to form "rooms" along the vertical height of the stand. An outer shield wraps around the main stand that can be easily put on or taken off, due to the use of one vertical zipper and one horizontal zipper on top.

The outer shield consists of some mesh type fabric, providing good ventilation and also for good visual effect and enhances the entertainment value.

The modular design, using smaller segments to form the long vertical posts, means the cost of storage and transportation is not burdensome for obtaining the tower structure from the stores and for moving it around.

The three posts are fixed in place by a top plate and bottom plate and along with a plurality of support plates in between the vertical gap.

In present application, four support plates are used, resulting in 5 vertical "rooms". In implementation time, this number can be altered according to deferent marketing needs, as long as the total height is not some safety concerns.

Around the peripheral edge of support plates and around the peripheral edge of bottom plate, there are three side holes made to allow the three posts to go through when installed.

Each of the three posts is made up of multiple straight segments.

One the lower end of each segment, there is some hollowed length, while the other end (which will be the upper end) of each segment will have a small protrusion 3, so that at installation time, the protrusion 3 will be pointing upwards and then fit into the hollowed portion of the other segment it is connected to.

Three short segments extend down from the under part of top plate, which are connected to the three posts in a vertical fashion, and by an adjustment device, resulting in the capability for adjusting total length (the vertical height of the three posts.

After the complete skeletal structure of main stand is completed, an outer shield will be used to wrap around outer shield. A vertical zipper and a horizontal zipper is provided to zip the outer shield in place. If there is some loose or slack portion, the adjustment device will help to reach a tight and snug fit of the outer shield to the main stand.

Three entrance holes are provided respectively to the bottom-most space, the mid-height space and the top-most space of the completed main stand. The material for the outer shied is generally made from cloth-based or other plastic fabric and preferably contains some portion of mesh-type texture to allow for good ventilation.

DETAILED DESCRIPTION OF THE PREFERRED EMBODIMENT

Figure 1:
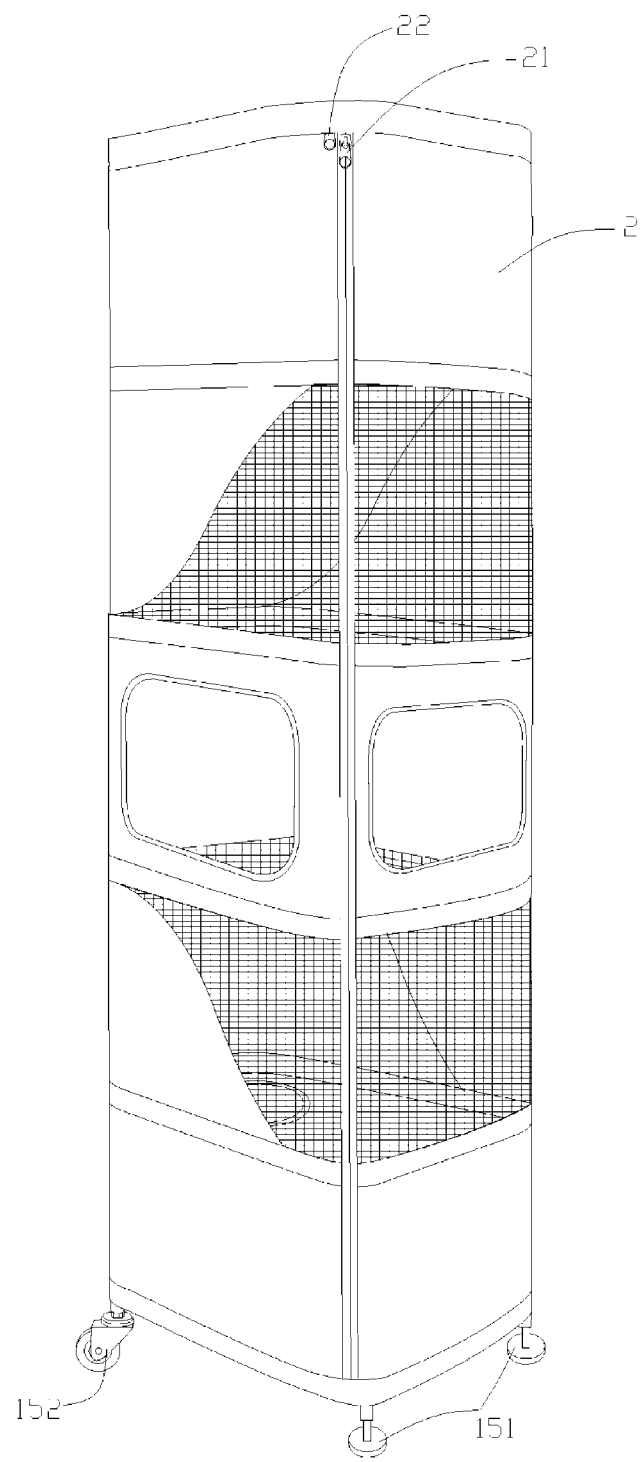
FIG. 1 shows a completed exercise and play tower of present invention, with both vertical and horizontal zippers shown.
Figure 2:
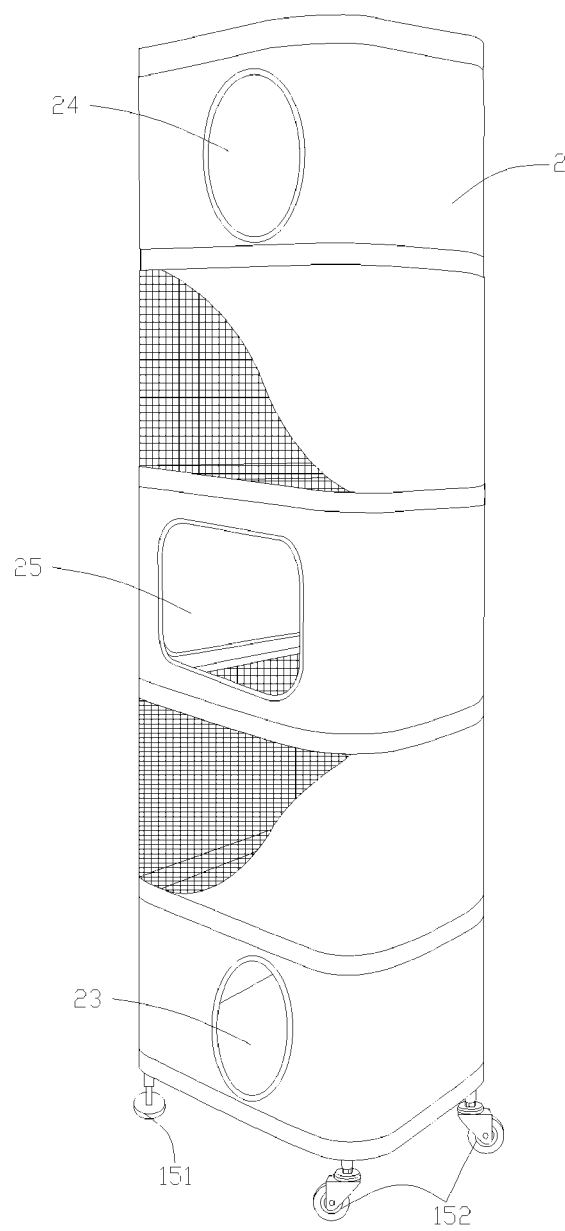
FIG. 2 shows yet another completed image of present invention, with entrance/exit holes made differently to the outer shield and varying foot supports.
Figure 3:
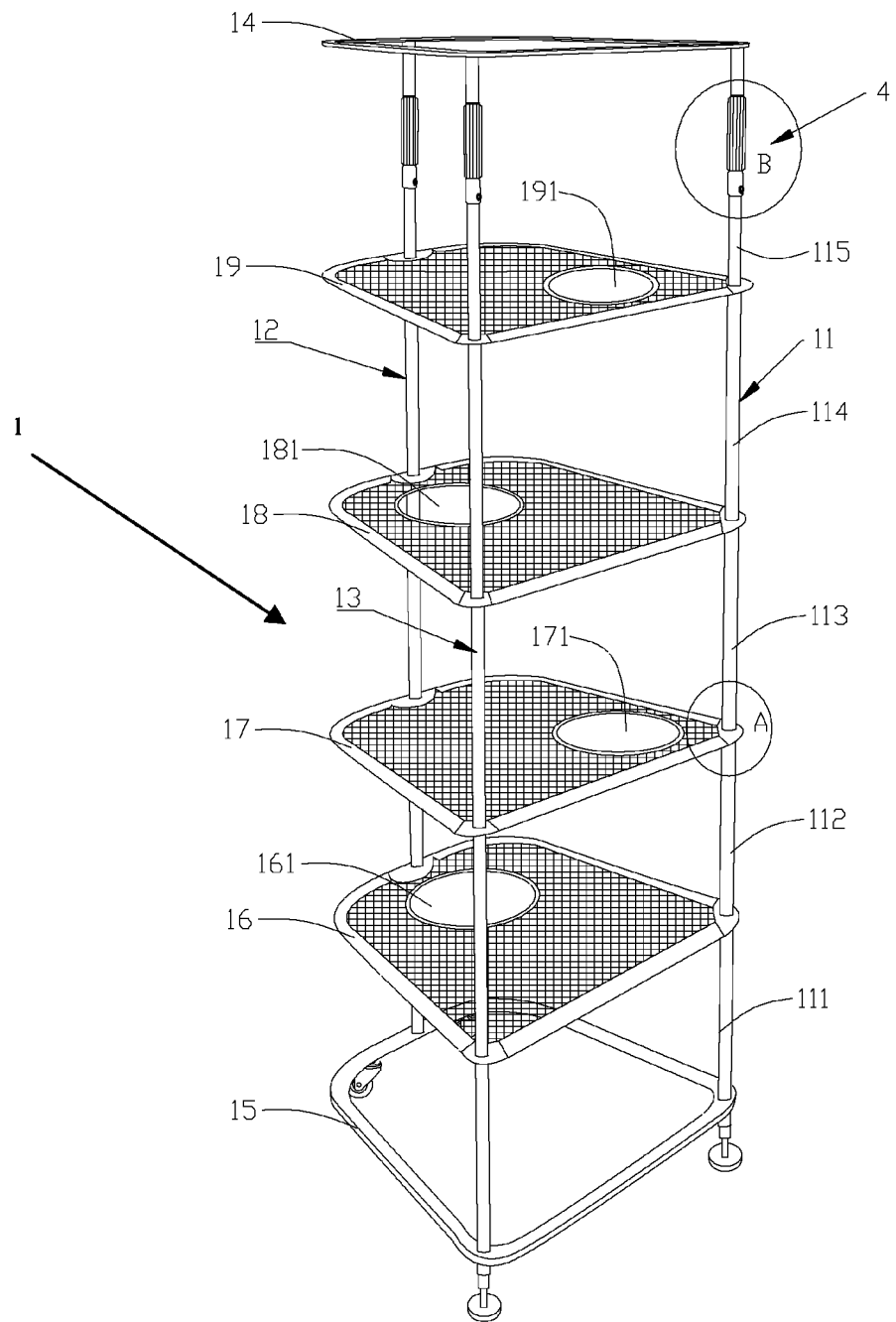
FIG. 3 shows the assembled skeletal structure of the main stand.
Figure 4:
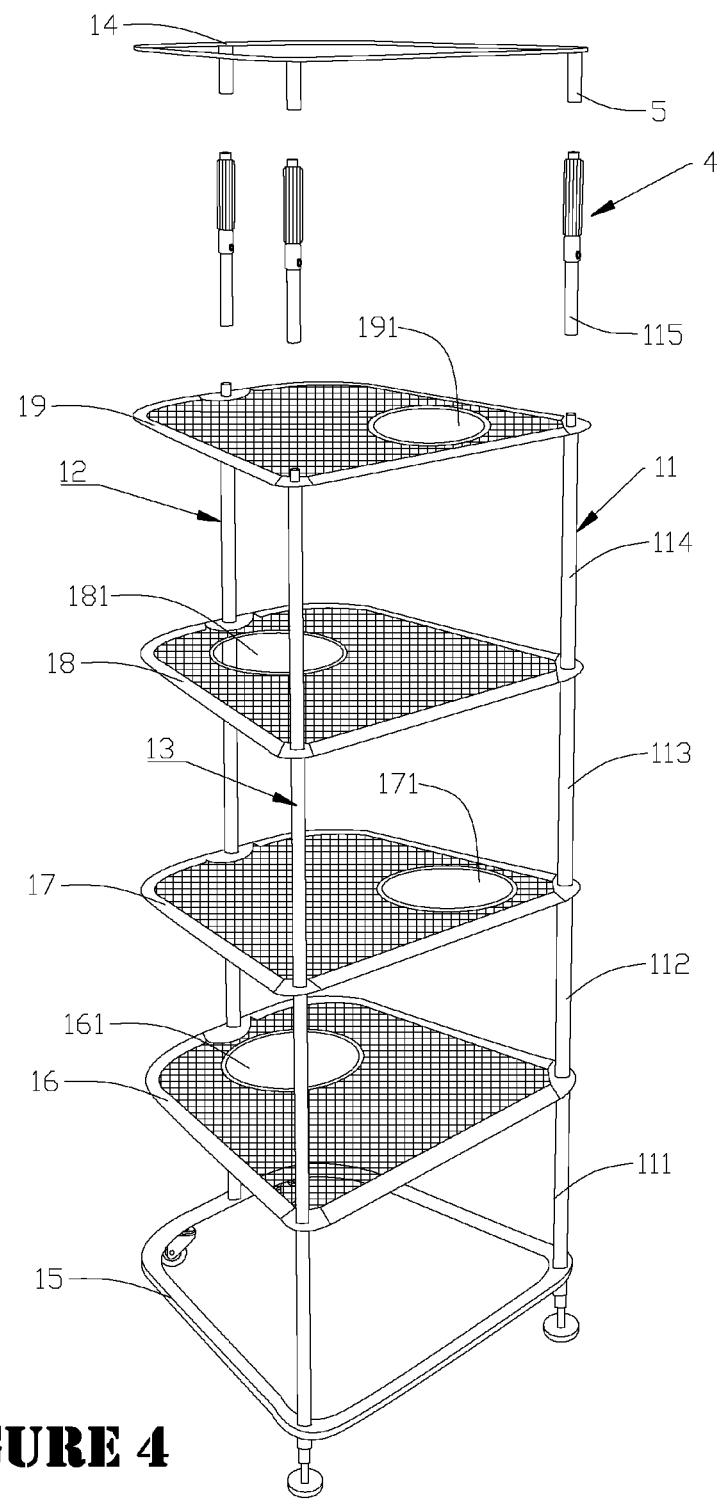
FIG. 4 shows the skeletal structure with the height adjustment portion highlighted.

Referring to FIGS. 1-3, the exercise and play tower of present invention consists of a main stand 1 and a layer of outer shield 2.

Main stand 1 is a skeletal structure formed by three vertically oriented posts: first post 11, second post 12 and third post 13. The three posts are generally parallel to one another when installed.

The three posts are connected on top by a top plate 14 and connected at the bottom by a bottom plate 15. Top plate 14 and bottom plate 15 have a planar surface that is generally parallel to the ground surface, when installed to the skeletal main stand structure 1.

Four support plates 16, 17, 18 and 19 are placed evenly in the vertical gap between top plate 14 and bottom plate 15, as shown in FIG. 3.

Around the peripheral edge of support plates 16, 17, 18 and 19 and around the peripheral edge of bottom plate 15, there are three side holes made to allow the three posts (11/12/13) to go through when installed.

The three side holes for support plate 16 are referred to as side holes 162; the three side holes for support plate 17 are referred to as side holes 172; the three side holes for support plate 18 are referred to as side holes 182; the three side holes for support plate 19 are referred to as support plate 192.

Each of the three posts (11/12/13) is made up of multiple straight segments. For example, from bottom to top, segments 111, 112, 113, 114 and 115 made up the overall length of first post 11.

The same description goes for second post 12 (having segments 121, 122, 123, 124 and 125) and third post 13 (having segments 131, 132, 133, 134 and 135), for the 5-segments connection to make an overall straight post.

On the lower end of each segment, there is some hollowed length, while the other end (which will be the upper end) of each segment will have a small protrusion 3, so that at the time of installation, the protrusion 3 will be pointing upwards and then fit into the hollowed portion of the other segment it is connected to.

Figure 5:
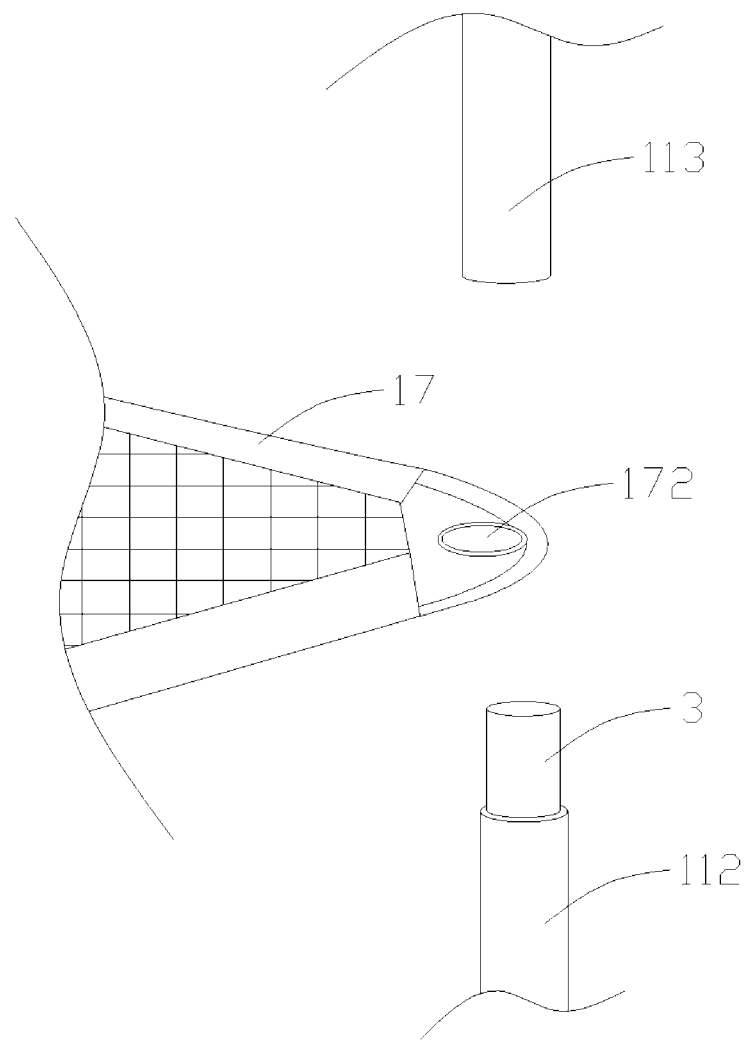
FIG. 5 shows the exploded view of the segment-connection, where the protrusion is sized to fit through side hole of support plate and for insertion into the lower portion of another segment on top.

Reference FIG. 5, which shows that the protrusion 3 from segment 112 will be inserted through side hole 172 (of support plate 17) and be connected to the under portion (having corresponding hollowed length) of segment 113.

The diameter of said small protrusion 3 is made to match the size of side holes (162/172/182/192), so that the connection of segments happens at the support plates, which are wedged in place by the small ledge between the small protrusion 3 and the normal diameter of each segment.

See the exploded view in FIG. 5.

Three short segments 5 extend down from the under part of top plate 14, which are connected to the three posts (11/12/13) in a vertical fashion, and by an adjustment device 4, which is made up of a thread section 41 (on top of each post) and a cap section 42 (on the lower end of short segment 5 corresponding to the post to be connected.)

Figure 6:
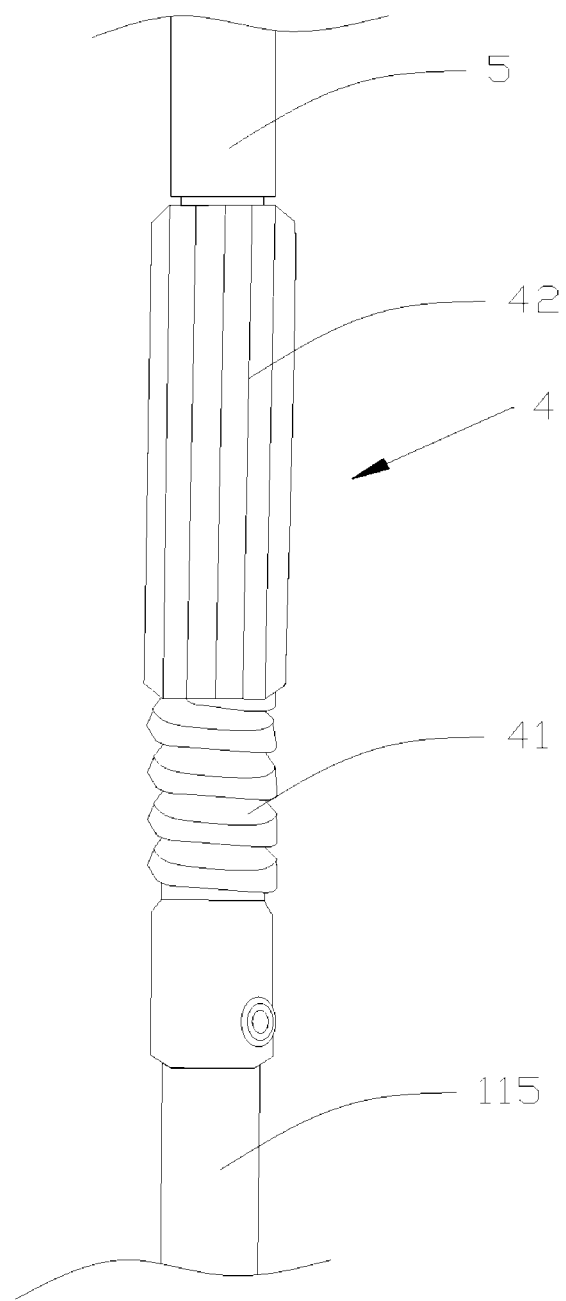
FIG. 6 shows the exploded view of the height adjustment device, with the thread portion and cap portion shown clearly.

The cap section 42 has matching thread lines in the inside surface, so that it can be "screwed" on and over the outer surface of the thread section 41, resulting in the capability for adjusting total length (the vertical height of the three posts), as shown in FIG. 6.

Three foot supports are located at the under portion of bottom plate 15. Depending on desired implementation, the three-foot supports can be any combination of foot piece 151 and/or caster wheel 152. FIG. 2 shows the usage of one-foot pieces 151 and two caster wheel 152 are attached to the under-side of bottom plate 15, vertically corresponding to the position of the three posts. FIG. 3 shows two-foot pieces 151 and one caster wheel 152.

After the complete skeletal structure of main stand 1 is completed, an outer shield 2 can be wrapped around it, by placing the outer shield fully around the total height of the main stand 1 and then tighten the vertical zipper 21. A horizontal zipper 22 is then used to keep a top cover in place.

Three entrance holes 23, 24 and 25 are provided reaching an unreasonable or hazardous lever, such as over six feet, which height may pose respectively to the bottom-most space, the mid-height space and the top-most space of the completed main stand 1, as shown in FIG. 2.

The material for the outer shield 2 is generally made from cloth-based or other plastic fabric and preferably contains some portion of mesh-type texture to allow for good ventilation.

What is claimed is:

1. An exercise and play tower for animals, comprising:
    Three vertical posts;
    A top plate having three downward protrusions coupled to at least three height adjustment devices for connecting to the three posts;
    A plurality of vertically spaced apart support plates, each with three side holes receiving said three vertical posts;
    Said protrusions and height adjustment devices are located between the top plate and the topmost of said support plates;
    A bottom plate having three foot supports located at the under portion of said bottom plate and with positions corresponding to the three vertical posts;
    A layer of outer shield with a vertical zipper to form a zipping line and a top horizontal zipper to zip up a top cover, whereby said outer shield will wrap around the three vertical posts with the top plate, bottom plate and the support plates installed in place; and,
    Wherein said at least three height adjustment devices each comprise a cap section extending down from the protrusion from said top plate, said cap section comprises thread lines on an inside surface for threadably connecting to a thread section on the top of each vertical post, such that by rotating said three vertical height adjustment devices about each vertical post the height of the top plate may be vertically adjusted.

2. The exercise and play tower of claim 1, wherein each of said vertical posts consists of a number of segments, with the number being one greater than the number of said support plates.

3. The exercise and play tower of claim 2, wherein each support plate has at least one hole to allow moving up or down by the animals.

4. The exercise and play tower for animals of claim 3, wherein said outer shield contains a plurality of holes made for animals to go in and out of the tower.

5. The exercise and play tower of claim 4, wherein said outer shield contains some portion of mesh material so as to allow good ventilation effect.

6. The exercise and play tower of claim, wherein the three-foot supports under said bottom plate can be any combination foot pieces and/or caster wheels.

* * * * *